(12) United States Patent
Repko

(10) Patent No.: US 10,444,535 B2
(45) Date of Patent: *Oct. 15, 2019

(54) FLIP-UP EYESHIELD ASSEMBLY

(71) Applicant: VEYES, LLC, Indianapolis, IN (US)

(72) Inventor: Mark Repko, Indianapolis, IN (US)

(73) Assignee: Veyes LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/035,959

(22) Filed: Jul. 16, 2018

(65) Prior Publication Data

US 2018/0321508 A1    Nov. 8, 2018

Related U.S. Application Data

(63) Continuation of application No. 15/556,778, filed as application No. PCT/US2016/023858 on Mar. 24, 2016, now Pat. No. 10,048,509.

(60) Provisional application No. 62/139,422, filed on Mar. 27, 2015.

(51) Int. Cl.
*G02C 3/02* (2006.01)
*A42B 1/24* (2006.01)
*A42B 1/06* (2006.01)
*G02C 7/10* (2006.01)

(52) U.S. Cl.
CPC ............... *G02C 3/02* (2013.01); *A42B 1/062* (2013.01); *A42B 1/247* (2013.01); *G02C 7/10* (2013.01)

(58) Field of Classification Search
CPC .......... G02C 9/04; G02C 3/006; G02C 3/003; G02C 3/02
USPC .............................. 351/155, 158, 41; 2/10, 12
See application file for complete search history.

(56) References Cited

U.S. PATENT DOCUMENTS

| 4,869,586 A * | 9/1989 | Chung | A42B 1/247 351/158 |
| 10,048,509 B2 * | 8/2018 | Repko | G02C 3/02 |

* cited by examiner

*Primary Examiner* — Hung X Dang
(74) *Attorney, Agent, or Firm* — Faegre Baker Daniels LLP

(57) ABSTRACT

An eyeshield assembly configured to couple to a brim of a head covering includes a pivot arm with a latch surface. The pivot arm is configured to move between a latched position, when the eyeshield assembly is in a use position, and a released position, when the eyeshield assembly is in a non-use position. The eyeshield assembly also includes a latch arm with a distal end configured to receive the latch surface of the pivot arm when the pivot arm is in the latched position. Additionally, the eyeshield assembly includes a hinge assembly operably coupled to the pivot arm and including a biasing element. The biasing element is configured to pivot the pivot arm relative to the latch arm to move the pivot arm from the latched position to the released position without human intervention.

13 Claims, 12 Drawing Sheets

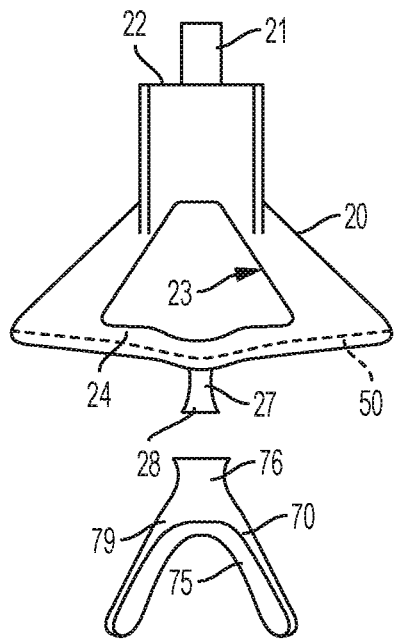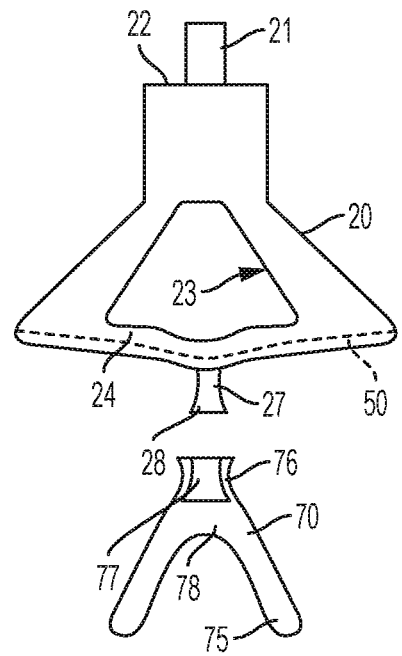
FIG. 15A  FIG. 15B
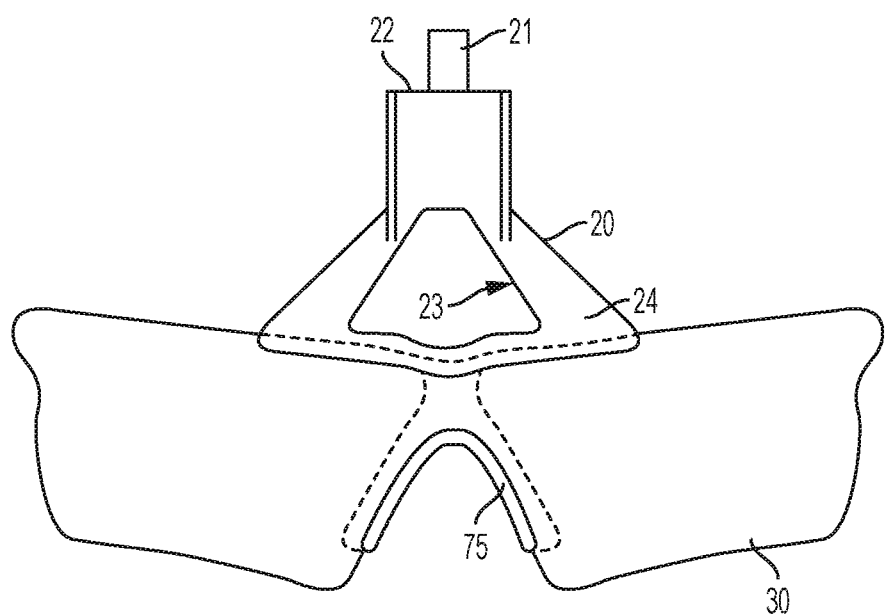
FIG. 16

FLIP-UP EYESHIELD ASSEMBLY

CROSS-REFERENCE TO RELATED APPLICATIONS

The present application is a continuation of U.S. patent application Ser. No. 15/556,778, titled "FLIP-UP EYESHIELD ASSEMBLY," filed on Sep. 8, 2017, now U.S. Pat. No. 10,048,509, which is a national phase of International Application No. PCT/US2016/023858, titled "FLIP-UP EYESHIELD ASSEMBLY," filed on Mar. 24, 2016, which claims priority to U.S. Provisional Patent Application Ser. No. 62/139,422, filed on Mar. 27, 2015, and entitled "FLIP-UP EYESHIELD ASSEMBLY," the complete disclosures of which are expressly incorporated by reference herein in their entireties.

TECHNICAL FIELD OF THE DISCLOSURE

The present disclosure relates to a flip-up eyeshield assembly, and more particularly, a flip-up eyeshield assembly pivotally attached to the brim of a head covering.

BACKGROUND OF THE DISCLOSURE

When a person is outside on a sunny day wearing a head covering with a brim, there are times when the person wants to also wear sunglasses in order to provide additional protection for their eyes from the sunlight. However, there also are times when the person wants to remove the sunglasses from their line of sight, such as in the shade. Thus, it would be advantageous to have a device that removably couples to the brim of a head covering and allows for a simple and quick transition from a use position of the sunglasses, in which a user wearing the sunglasses positions the sunglasses in front of their eyes to protect their eyes, to a non-use position, in which the user removes the sunglasses from his/her line of sight when desired. Furthermore, it would be advantageous for the device to transition the sunglasses from the use position to the non-use position with substantially a hands-free operation. Furthermore, it would be advantageous for the device to keep the sunglasses attached to the brim of a head covering when in the non-use position to eliminate the inconvenience of having to find a storage location for the sunglasses when they are removed from the user's line of sight.

SUMMARY OF THE DISCLOSURE

In one embodiment of the present disclosure, an eyeshield assembly is configured to couple to a brim of a head covering. The eyeshield assembly includes a pivot arm with a latch surface. The pivot arm is configured to move between a latched position, when the eyeshield assembly is in a use position, and a released position, when the eyeshield assembly is in a non-use position. The eyeshield assembly also includes a latch arm with a distal end configured to receive the latch surface of the pivot arm when the pivot arm is in the latched position. Additionally, the eyeshield assembly includes a hinge assembly operably coupled to the pivot arm and including a biasing element. The biasing element is configured to pivot the pivot arm relative to the latch arm to move the pivot arm from the latched position to the released position without human intervention.

In one aspect of the assembly, the biasing element biases the pivot arm toward the released position.

In a further aspect of the assembly, the biasing element includes a single torsion spring.

In another aspect of the assembly, the biasing element includes a double torsion spring.

In another aspect of the assembly, the eyeshield assembly further comprises an eyeshield coupled to the pivot arm. The pivot arm is configured to move the eyeshield between a use position, in which the eyeshield intersects a forward-facing line of sight of a user, and a non-use position, in which the eyeshield is positioned upwardly of the forward-facing line of sight.

In another aspect of the assembly, the eyeshield is positioned forward and upward of a front edge of the brim of the head covering when the eyeshield is in the non-use position.

In another aspect of the assembly, the distal end of the latch arm includes a shoulder configured to receive the latch surface of the pivot arm when the pivot arm is in the latched position.

In another embodiment of the present disclosure, an eyeshield assembly configured to couple to a brim of a head covering includes a base having a plurality of elongated members configured to removably couple with the brim, a pivot arm pivotably coupled to the base and configured to move between a latched position and a released position, and a hinge assembly operably coupled to the pivot arm and including a biasing element. The biasing element is configured with a pre-loaded spring force to automatically pivot the pivot arm from the latched position to the released position without human intervention. Additionally, the eyeshield assembly includes an eyeshield coupled to the pivot arm. The pivot arm is configured to move the eyeshield between a use position, in which the eyeshield intersects a forward-facing line of sight of a user, and a non-use position, in which the eyeshield is positioned upwardly of the forward-facing line of sight.

In another aspect of the assembly, the eyeshield is positioned forward and upward of a front edge of the brim of the head covering when the eyeshield is in the non-use position.

In a further aspect of the assembly, the eyeshield assembly further comprises a nosepiece coupled to the eyeshield. The pivot arm further includes a post extending downwardly and the nosepiece includes a bridge and a mounting member extending upwardly from the bridge. The mounting member is attachable to the post and the post includes an interlocking portion. The mounting member includes a recess being sized and configured to receive at least the interlocking portion of the post for attaching the nosepiece to the pivot arm.

In another aspect of the assembly, the pivot arm further includes a groove extending at least partially along the distal end, the post being connected to the pivot arm posteriorly to the groove.

In another aspect of the assembly, the post is integrally formed with the pivot arm.

In another aspect of the assembly, the recess of the mounting member is formed into a posterior side of the mounting member.

In a further aspect of the assembly, the eyeshield is configured to be mounted anterior to the post and the mounting member of the nosepiece.

In another embodiment of the present disclosure, the eyeshield includes two separate lenses spaced apart from each other.

In one aspect of the assembly, the eyeshield assembly defines a unitary lens extending continuously between the user's eyes.

In a further aspect of the assembly, a portion of the pivot arm is configured to abut a portion of the base when the pivot arm is in the released position.

In another aspect, the eyeshield assembly further comprises a latch arm coupled to the base and configured to receive a portion of the pivot arm when the pivot arm is in the latched position.

BRIEF DESCRIPTION OF THE DRAWINGS

Advantages and features of the embodiments of this disclosure will become more apparent from the following detailed description of exemplary embodiments when viewed in conjunction with the accompanying drawings, wherein:

FIG. 15A is an exploded front view of the pivot arm and nosepiece of the flip-up eyeshield assembly of FIG. 1;

FIG. 15B is an exploded rear view of the pivot arm and the nosepiece of FIG. 15A;

FIG. 16 is a front view of the pivot arm and the nosepiece of FIGS. 15A and 15B, assembled together with the eyeshield of the flip-up eyeshield assembly of FIG. 1;

DETAILED DESCRIPTION OF THE DISCLOSURE

Figure 1:
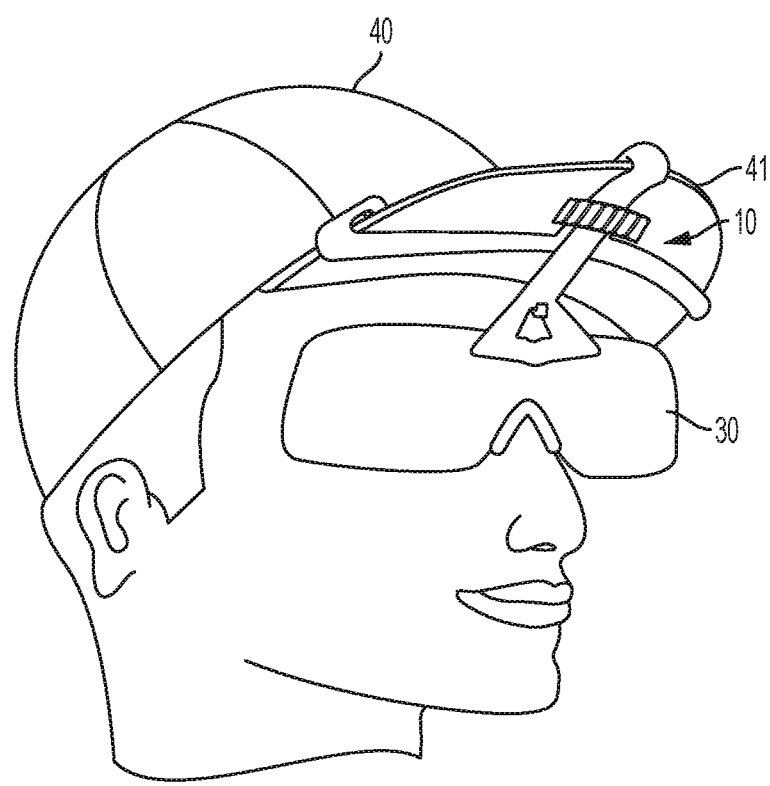
FIG. 1 is a front perspective view of an embodiment of a flip-up eyeshield assembly of the present disclosure being used in a use position by a user and attached to a head covering.
Figure 2:
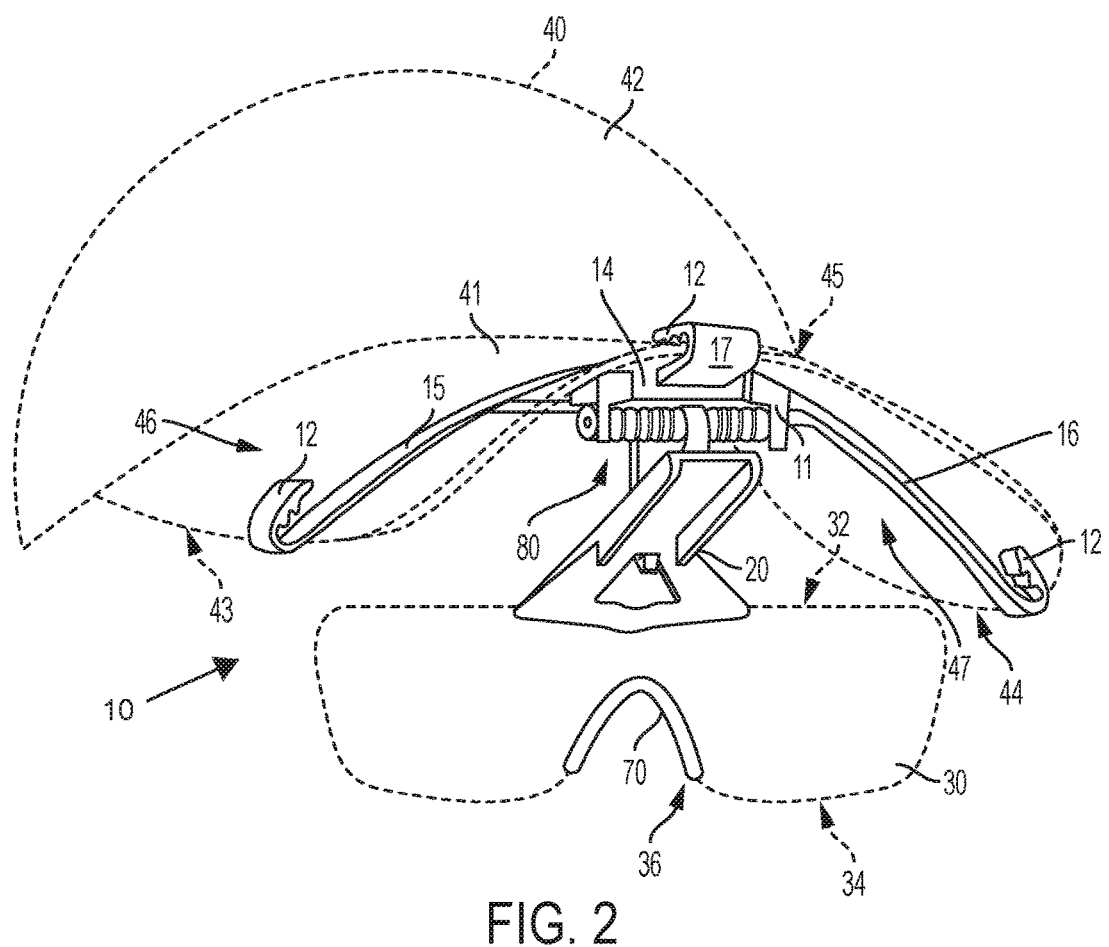
FIG. 2 is a front perspective view of a hinge assembly of the flip-up eyeshield assembly of FIG. 1.

With reference to FIGS. 1-5B, an embodiment of a flip-up eyeshield assembly 10 is provided. Referring to FIG. 2, eyeshield assembly 10 is generally configured to pivotally couple an eyeshield 30 to a head covering 40 having a body portion 42 which fits over the head of a user and a visor or brim 41 which projects away from body portion 42. In various embodiments, head covering 40 may be a baseball hat, visor, or any similar head coveting which includes brim 41. In an exemplary embodiment, brim 41 extends forwardly from the user's face and serves to shade the user's eyes. Furthermore, brim 41 may generally include a left edge 43, a right edge 44, a front edge 45, an upper surface 46 and a lower surface 47. Additionally, in various embodiments, brim 41 may have a concave shape and/or may be constructed with a variety of dimensions and shapes.

Referring to FIG. 2, flip-up eyeshield assembly 10 generally includes a base 11, a pivot arm 20, a nosepiece 70, a hinge assembly 80 and eyeshield 30. Eyeshield 30 of assembly 10 generally includes an upper edge 32 which is coupled to at least pivot arm 20, a lower edge 34 configured to be positioned below the user's eyes, and a nosepiece opening 36 which receives nosepiece 70. In various embodiments, eyeshield 30 may be formed of a unitary lens extending continuous between both of the user's eyes, while in other embodiments eyeshield 30 may include dual and separate lenses 31, each configured to be positioned in front of only one of the user's eyes (see FIGS. 17 and 18). Eyeshield 30 may be formed in any other configuration and shape. Illustratively, eyeshield 30 is tinted such that eyeshield 30 defines sunglasses, however, eyeshield 30 may be comprised of a translucent or transparent material in any color or may be a clear translucent material such that flip-up eyeshield assembly 10 may be configured for a plurality of applications. Additionally, eyeshield 30 may be comprised of a polarized lens(es).

Figure 3:
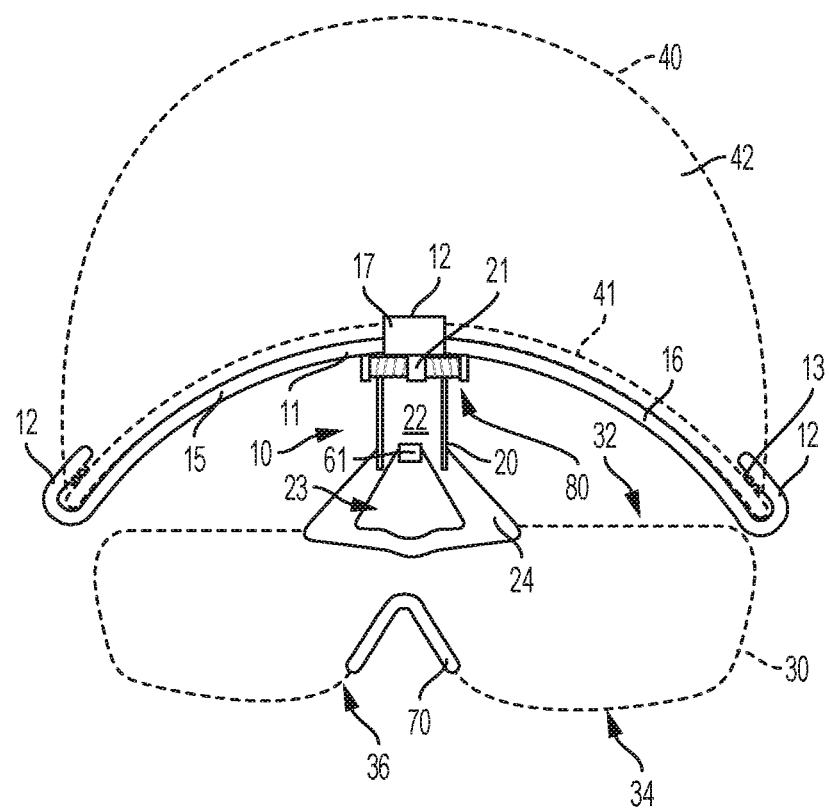
FIG. 3 is a front view of the flip-up eyeshield assembly of FIG. 1 in the use position.

Referring now to FIGS. 2 and 3, base 11 of eyeshield assembly 10 is generally configured to couple to lower surface 47 of brim 41. In various embodiments, base 11 may generally be made from a resilient and lightweight material, such as plastic. In an exemplary embodiment, base 11 is molded as a single piece. In one embodiment, base 11 generally includes a base panel 14 positioned adjacent lower surface 47 of brim 41, a first elongated curved member 15 coupled to base panel 14 and extending along lower surface 47 of brim 41, a second elongated curved member 16 coupled to base panel 14 and also extending along lower surface 47 of brim 41, and an attachment member 17 configured to extend from lower surface 47 of brim 41 to upper surface 46 of brim 41 and couple with front edge 45 of brim 41. In general, first elongated curved member 15 and second elongated curved member 16 extend outwardly from opposite sides of base panel 14 so as to extend from left edge 43 of brim 41 to right edge 44 of brim 41. Referring to FIGS. 2 and 3, in various embodiments, first elongated curved member 15, base panel 14, and second elongated curved member 16 may be integrally formed together and shaped with a continuous curvature so as to substantially conform to the concave contour of lower surface 47 of brim 41. Additionally, attachment member 17 may be configured to extend centrally and tangentially from base panel 14 to front edge 45 of brim 41 and then extend upwardly from front edge 45 to upper surface 46 of brim 41. In various embodiments, base panel 14 may be visible from a front view of assembly 10, while in other embodiments of assembly 10, base panel 14 may be obstructed from the front view by attachment member 17 and/or hinge assembly 80.

Additionally, and still referring to FIGS. 2 and 3, distal ends of each of first elongated curved member 15, second elongated curved member 16 and attachment member 17 may each include an integral coupling portion 12, illustratively a hooked end portion, having a substantially U-shaped cross section for coupling with left edge 43, right edge 44, and front edge 45, respectively, of brim 41. Referring to FIGS. 1-4, coupling portion 12 is generally configured to engage brim 41 in a clip-on manner. Additionally, in various embodiments, coupling portions 12 may include a plurality of ridges, teeth or rough protrusions 13 (FIG. 3) that are configured to engage at least upper surface 46 of brim 41 for frictional engagement between brim 41 and base 11. In one embodiment, protrusions 13 are integral with coupling portions 12. From the foregoing, it will be understood that base 11 may be attached and detached from brim 41 by selectively attaching or removing each coupling portion 12 from the respective edge of brim 41 such that flip-up eyeshield assembly 10 is removably coupled to head covering 40 without permanent fasteners.

Alternatively, some or all of members 15, 16, 17 may be removed from flip-up eyeshield assembly 10 such that flip-up eyeshield assembly 10 is coupled to head covering 40 in other configurations. For example, at least a portion of flip-up eyeshield assembly 10 may be coupled to head covering 40 with magnets, an adhesive, stitching, with fasteners, or through any other type of coupling mechanism.

Figure 6:
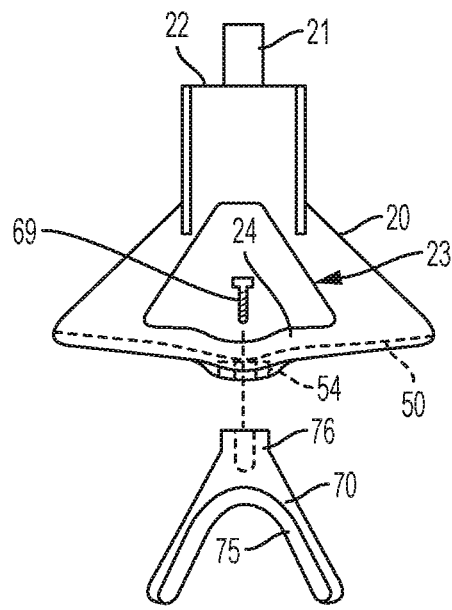
FIG. 6 is an exploded front view of a pivot arm and a nosepiece of the flip-up eyeshield assembly of FIG. 1.
Figure 7:
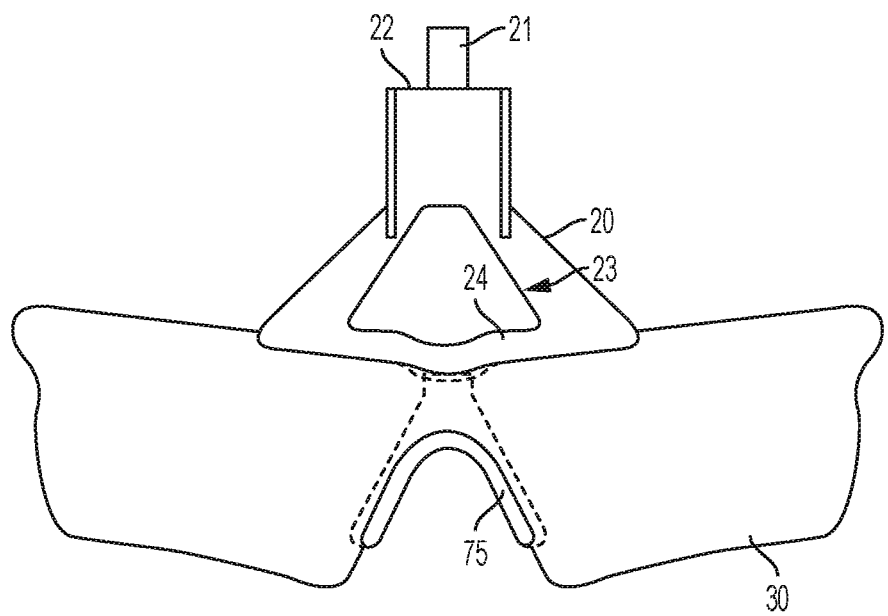
FIG. 7 is a front view of the pivot arm and the nosepiece of FIG. 6 assembled together with the eyeshield of the flip-up eyeshield assembly of FIG. 1.

Referring now to FIGS. 3, 6 and 7, pivot arm 20 of base 11 generally includes a hinge collar 21, a pivot panel 22, a latch opening 23 and a brow member 24. Pivot panel 22 of pivot arm 20 generally extends from base panel 14 to just above latch opening 23. In various embodiments, the length of pivot panel 22 may be shortened or extended in order for eyeshield 30 to be vertically shifted. Additionally, any and all components of pivot arm 20 may be made from a resilient and lightweight material, such as plastic, and/or molded as a single piece.

In various embodiments, brow member 24 may include outer edges that extend outwardly from pivot panel 22 to a bottom portion of brow member 24. Latch opening 23 is generally positioned below pivot panel 22, between the outer edges of brow member 24, and above the bottom portion of brow member 24. In various embodiments, latch opening 23 may include a proximal end and a distal end, wherein the proximal end has a smaller width than the distal end. Illustratively, latch opening 23 and brow member 24 each define a generally triangular shape having an apex portion at the proximal ends thereof and a base at the distal ends thereof. Additionally, in various embodiments, the outer edges of brow member 24 may be parallel to one another such that brow member 24 generally defines a rectangle rather than the generally-defined triangle shown in FIG. 3.

Figure 8:
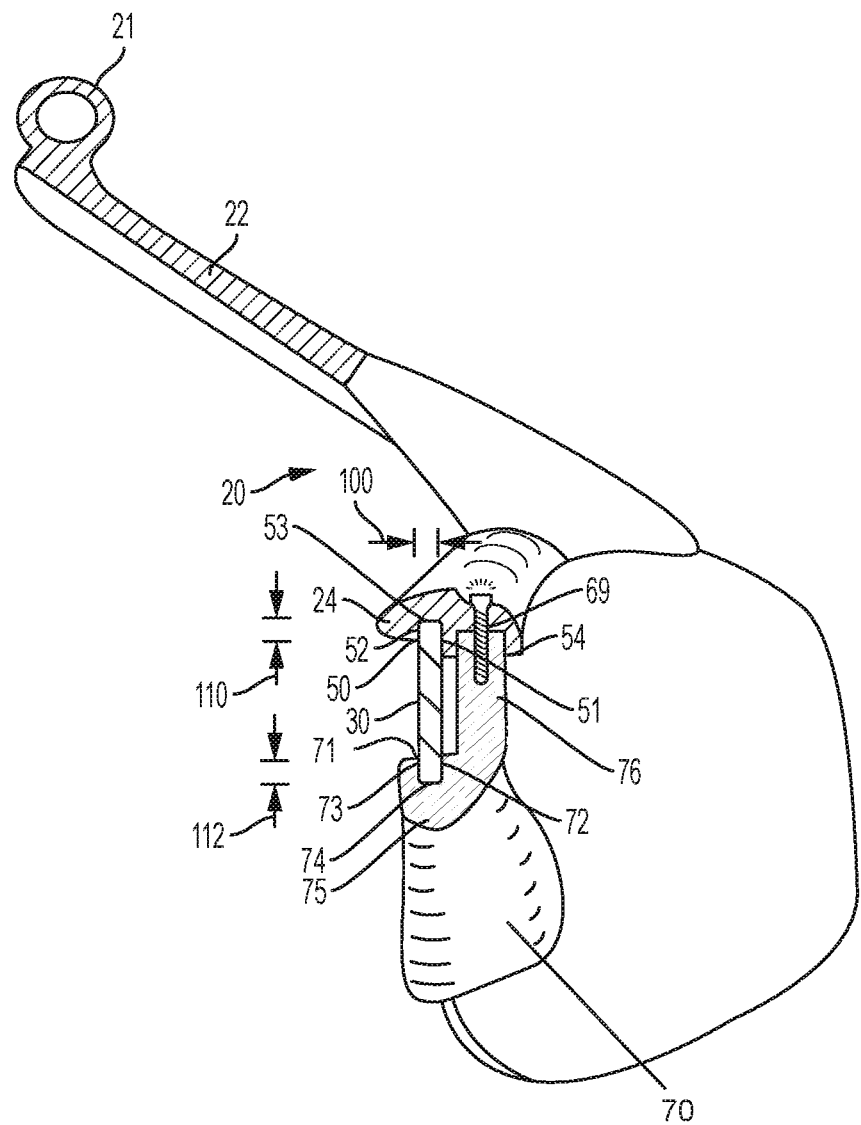
FIG. 8 is a cross-sectional view of the pivot arm, the nosepiece and the eyeshield of FIG. 7.

With reference to FIG. 8, brow member 24 of pivot arm 20 may include a groove 50. Groove 50 may be configured to extend at least partially along a lower edge of the bottom portion of brow member 24. In an exemplary embodiment, groove 50 extends the entire length of the bottom portion of brow member 24. In various embodiments, groove 50 is sized and configured to removably receive at least a portion of upper edge 32 of eyeshield 30 for coupling eyeshield 30 to at least a portion of pivot arm 20 such that eyeshield 30 may pivot or rotate with pivot arm 20, as disclosed herein. Groove 50 may define a slot having a width 100 and a depth 110. Furthermore, in various embodiments, groove 50 may be formed having internal faces that are of different or equal dimensions. For example, a rearward face 51 of groove 50 may have a greater cross-sectional length than a forward face 52, and may further differ in dimensions from that of an upper face 53 of groove 50. Rearward, forward, and upper faces 51, 52, 53 of groove 50 may be modified to provide varying degrees of retention of upper edge 32 of eyeshield 30 within groove 50.

Figure 4:
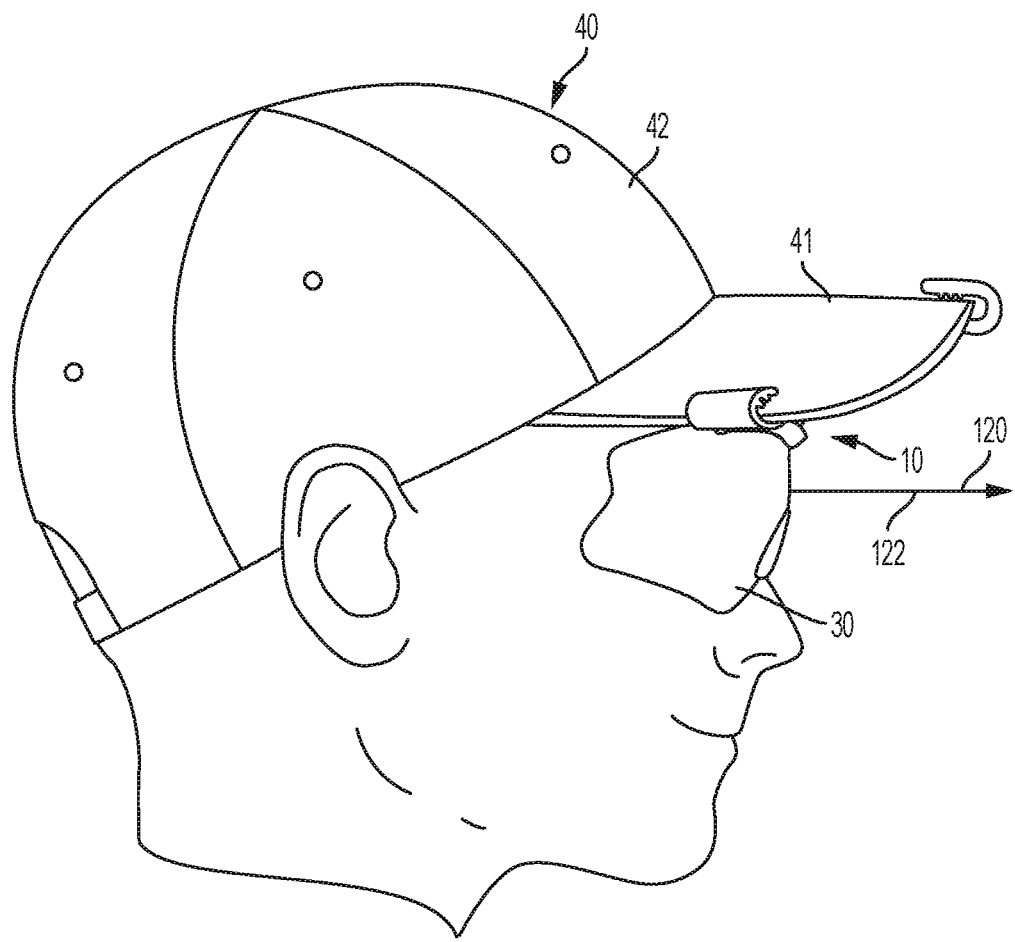
FIG. 4 is a side view of the flip-up eyeshield assembly of FIG. 1, illustrating the alignment of the user's line of sight (LOS) with an optical centerline (OCL) of the eyeshield assembly when in the use position.
Figure 5A:
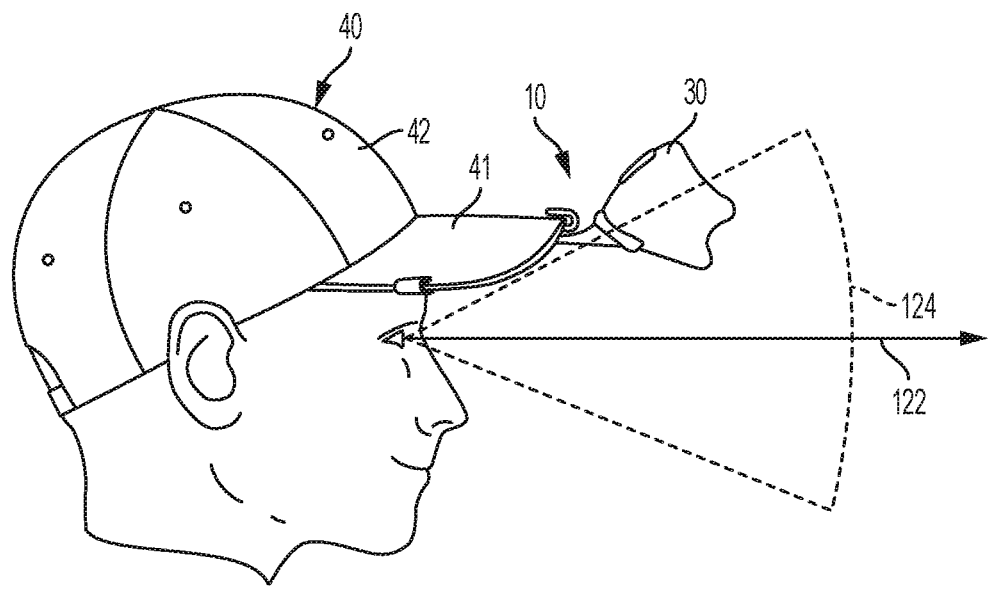
FIG. 5A is a side view of the flip-up eyeshield assembly of FIG. 1, illustrating the position of the eyeshield in relation to the user's LOS and field of vision (FOV) when in a non-use position.
Figure 5B:
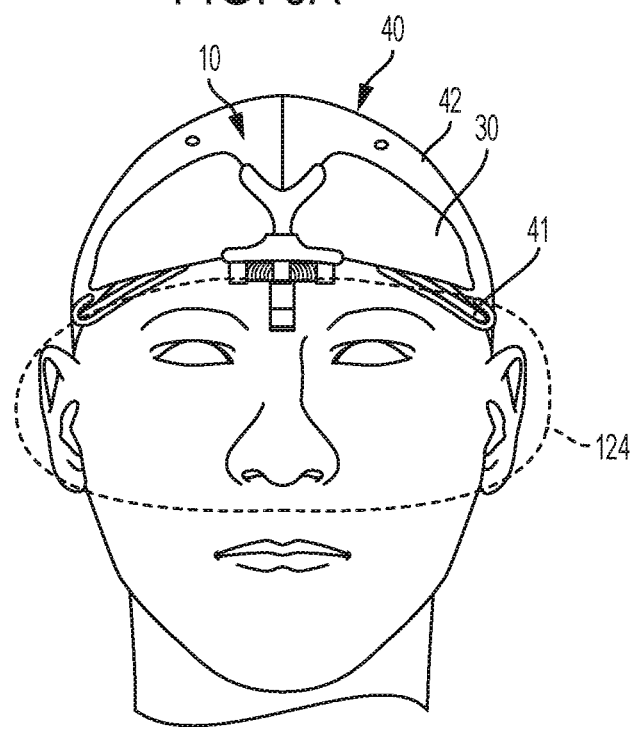
FIG. 5B is a front view of the flip-up eyeshield assembly of FIG. 5A in the non-use position.

Referring to FIGS. 3-5B, pivot arm 20 may pivot or rotate between a use or downward position, in which eyeshield 30 is positioned in front of the user's eyes (FIG. 4), and a non-use or upward position, in which eyeshield 30 is positioned above the user's eyes (FIGS. 5A and 5B). More particularly, eyeshield 30 may define an optical centerline (OCL) 120 which is a centerline between each lens portion of eyeshield 30 and generally corresponding to a position vertically above the bridge of the user's nose. Referring to FIGS. 4-5B, the user of flip-up eyeshield assembly 10 may have a forward-facing line of sight (LOS) 122 when the user is looking directly ahead or in front of him, which may be coincident or parallel to OCL 120 (FIG. 4), and a field of vision (FOV) 124 projecting in a radial arc from LOS 122 (FIGS. 5A and 5B) which expands the user's range of vision to see things above and below LOS 122.

When eyeshield 30 is in the use position, pivot arm 20 generally positions eyeshield 30 in front of the user's eyes, substantially aligning OCL 120 of eyeshield 30 with the user's LOS 122, as shown in FIG. 4. In the non-use position, pivot arm 20 generally positions eyeshield 30 away from the user's eyes, substantially removing eyeshield 30 from the user's LOS 122 and out of the user's FOV 124 (FIGS. 5A and 5B). More particularly, as shown in 5A and 5B, at least a portion of eyeshield 30 is positioned upwardly from the user's FOV 124 and LOS 122. Additionally, at least a portion of eyeshield 30 is positioned forward of forward edge 45 of brim 41. In this way, when eyeshield 30 is in the non-use position, eyeshield 30 is fully and completely removed from under lower surface 47 of brim 41 and extends forwardly and upwardly from brim 41 such that eyeshield 30 does not interfere with the user's LOS 122 and at least a majority of the user's FOV 124. This positioning of eyeshield 30 when in the non-use position allows the user's FOV 124 and LOS 122 to be unobstructed by eyeshield 30 when the user desires to move eyeshield 30 to the non-use position.

Figure 11:
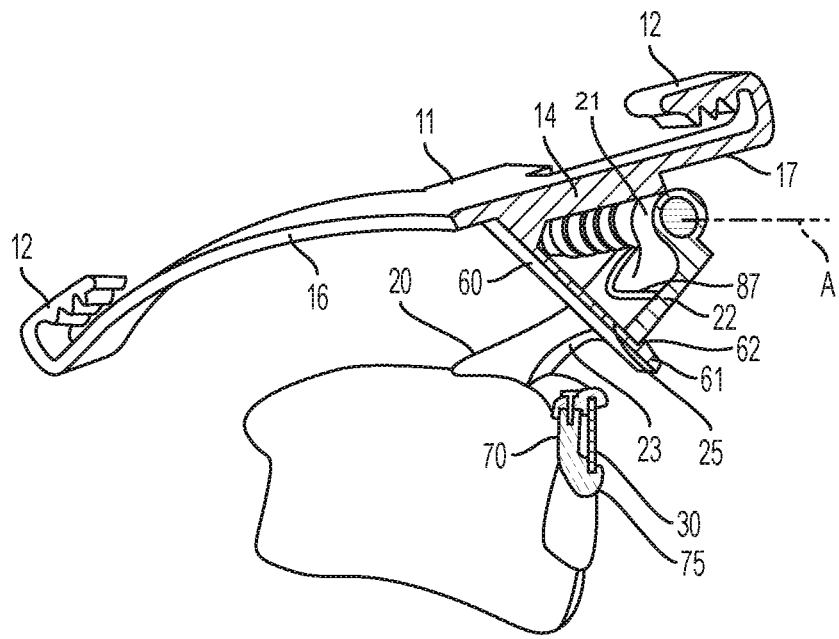
FIG. 11 is a cross-sectional view of the flip-up eyeshield assembly of FIG. 1, illustrating the pivot arm in a latched condition with the eyeshield assembly in the use position.
Figure 12:
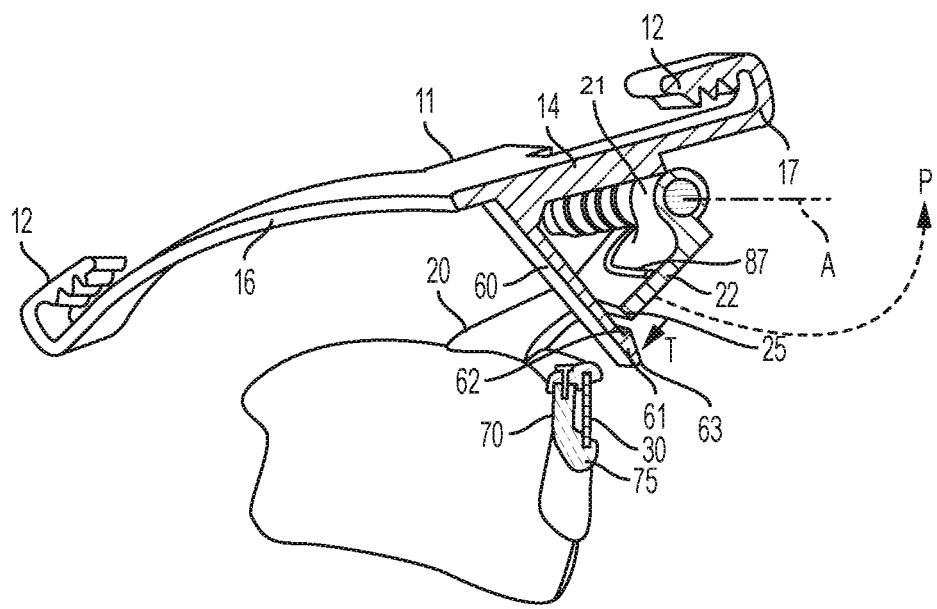
FIG. 12 is a cross-sectional view of the flip-up eyeshield assembly of FIG. 1, illustrating the pivot arm in a released condition.
Figure 13:
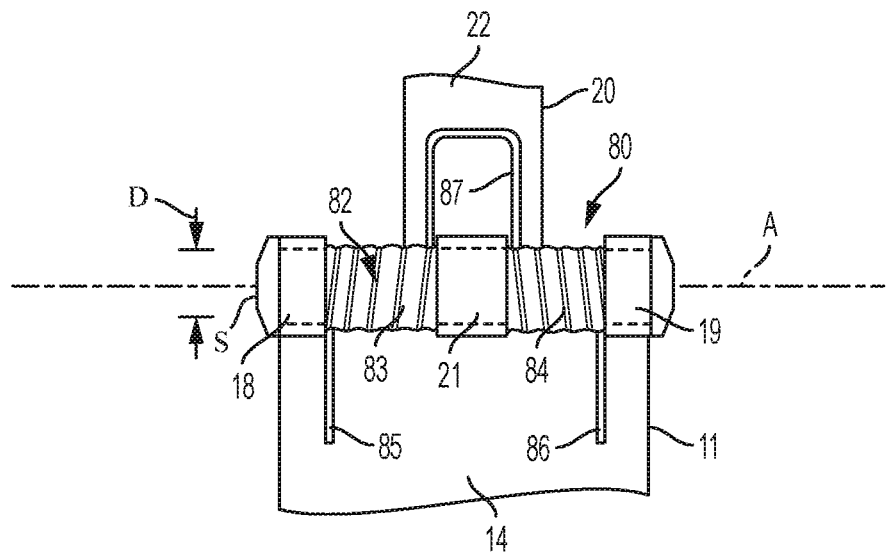
FIG. 13 is a bottom view of an embodiment of the hinge assembly of the flip-up eyeshield assembly of FIG. 2.

In order to pivot eyeshield 30 between the use and non-use positions, and referring to FIGS. 9-14, hinge assembly 80 is provided on flip-up eyeshield assembly 10. More particularly, hinge assembly 80 is operably coupled with hinge collar 21 of pivot arm 20. Hinge assembly 80 may be a mechanical device comprising a shaft S and a biasing element 82 (FIG. 13) to assist in moving, rotating or pivoting pivot arm 20 and eyeshield 30 between the use position and the non-use position. In one embodiment, biasing element 82 is positioned around shaft 5, as shown in FIG. 13. Additionally, pivot panel 22 of pivot arm 20 may be rotatably coupled to shaft S, as shown in FIGS. 9-14. Shaft S may be any suitable type of bolt, dowel, rod, screw, mandrel or the like. Shaft S may have a diameter D, as shown in FIG. 13, and a pivot axis A extending through the center of diameter D of shaft S such that rotation of pivot arm 20 occurs about pivot axis A of shaft S. Additionally, base panel 14 of base 11 may be coupled to shaft S or another portion of hinge assembly 80, however, base panel 14 may remain in a fixed position relative to shaft S such that pivot arm 20 may rotate relative to both shaft S and base panel 14. Alternatively, base panel 14 also may be configured to pivot about pivot axis A of shaft S. Additionally, in various embodiments, hinge collar 21 of pivot arm 20 may concentrically align with shaft S and hinge collar 21 may be concentric with shaft 5, as shown in FIG. 13. Furthermore, in various embodiments, base panel 14 of base 11 may include additional hinge collars 18, 19 and all three hinge collars 18, 19, 21 may be concentrically positioned on shaft S.

Biasing element 82 of hinge assembly 80 may include any suitable type of mechanical spring (e.g., a compression spring, a torsion spring, a coil spring, a leaf spring, or an other type of spring), elastic cord, or the like that applies force to pivot arm 20 in the desired direction. In one embodiment, as shown in FIG. 13, biasing element 82 of hinge assembly 80 is a double torsion spring coupled to base 11 and pivot arm 20. In one embodiment, biasing element 82 generally has a first coil spring 83 and a second coil spring 84 wrapped around or concentric with a shaft S.

More particularly, first coil spring 83 of biasing element 82 may have a first leg 85 extending radially outward from first coil spring 83 and first leg 85 may be in contact with base panel 14. Additionally, second coil spring 84 may have a second leg 86 extending radially outward from second coil spring 84 and second leg 86 may be in contact with base panel 14. In one embodiment, both legs 85, 86 extend in substantially the same direction. In various embodiments, such as that shown in FIG. 11, biasing element 82 may further include a third leg 87 extending radially outward from both first coil spring 83 and second coil spring 84 and configured in the shape of a "U" so as to couple first coil spring 83 to second coil spring 84. Generally, third leg 87 extends radially outward in a different direction than first and second legs 85, 86. Third leg 87 may be in contact with pivot panel 22 of pivot arm 20, as shown in FIG. 11. In one embodiment, biasing element 82 is configured so that first and second legs 85, 86 are compressed toward third leg 87 when assembled, resulting in first and second legs 85, 86 being biased away from third leg 87. Thus, in various embodiments, biasing element 82 may be pre-loaded in torsion, resulting in a spring tension which is configured to bias pivot arm 20 toward the non-use position. More particularly, the positions of legs 85, 86, 87 and the tension in springs 83, 84 applies a force to legs 85, 86, 87 to allow hinge assembly 80 to bias or predispose pivot arm 20 and, therefore, eyeshield 30 toward the non-use position such that eyeshield 30 and pivot arm 20 may automatically move to the non-use position with no need for the user to guide eyeshield 30 to the non-use position, as disclosed herein.

In various embodiments, first and second legs 85, 86 may be secured through an opening provided on or in base panel 14 and/or may be secured to base panel 14 utilizing a fastener, rivet, pin, adhesive, a friction fit, or the like (not shown). Likewise, third leg 87 may be secured by an opening provided on or in pivot panel 22 and/or may be secured to pivot panel 22 utilizing a fastener, rivet, pin or the like (not shown).

Figure 14:
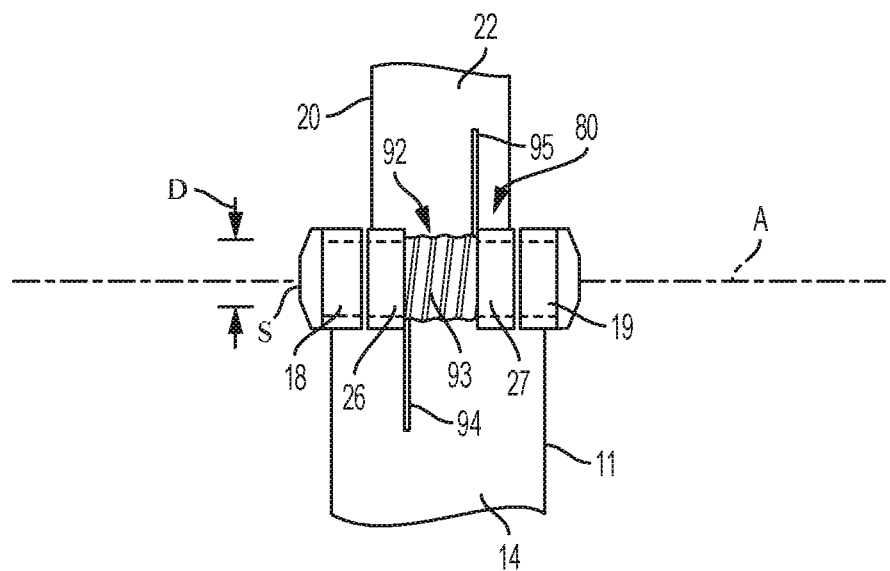
FIG. 14 is a bottom view of an another embodiment of the hinge assembly of the flip-up eyeshield assembly of FIG. 1.

Referring now to FIG. 14, in alternative embodiments, hinge assembly 80 may utilize a single biasing element 92 concentric with shaft S. In this embodiment, pivot arm 20 may include additional hinge collars 26, 27, and all hinge collars 18, 19, 26, 27 may be concentrically positioned on shaft S. As shown in FIG. 14, biasing element 92 may include a single coil spring 93 wrapped around or concentric with shaft S. In various embodiments, biasing element 92 may have a rear leg 94 extending radially outward from coil spring 93 and a forward leg 95 also extending radially outward from coil spring 93 but in a direction different than rear leg 94. In one embodiment, forward leg 95 extends radially outward in a direction substantially opposite of rear leg 94. Illustratively, rear leg 94 may bear against base panel 14, while forward leg 95 may bear against pivot panel 22. Additionally, biasing element 92 may be configured so that rear and forward legs 94, 95 are compressed toward each other when installed, resulting in rear and forward legs 94, 95 being biased away from one another. Thus, in various embodiments, biasing element 92 may be pre-loaded and configured to bias pivot arm 20 toward the non-use position. More particularly, the positions of legs 94, 95 and the tension in spring 93 applies a force to legs 94, 95 to allow hinge assembly 80 to bias or predispose pivot arm 20 to move eyeshield 30 toward the non-use position such that eyeshield 30 and pivot arm 20 may automatically move to the non-use position with no need for the user to guide eyeshield 30 to the non-use position, as disclosed herein.

Still referring to FIG. 14, in various embodiments, legs 94, 95 may be coupled to an outer surface of base panel 14 and pivot panel 22, respectively. Furthermore, in various embodiments, rear leg 94 may be secured through an opening provided within base panel 14 and/or may be secured to base panel 14 utilizing a fastener, rivet, pin, adhesive, a friction fit, or the like (not shown). Likewise, forward leg 95 may be secured through an opening provided within pivot panel 22 and/or may be secured to pivot panel 22 utilizing a fastener, adhesive, a friction fit, a rivet, pin or the like (not shown).

Because hinge assembly 80 includes biasing member 82 or 92, hinge assembly 80 is generally configured to bias pivot arm 20 toward the non-use position. For example, biasing element 82, 92 is configured and positioned on shaft S with a pre-loaded spring force that is biased in an upward direction. In one embodiment, the orientation and tension of legs 85, 86, 87 of biasing element 82 and the orientation and tension of legs 94, 95 of biasing element 92 predispose pivot arm 20 to move eyeshield 30 to the non-use position. As such, biasing element 82, 92 is biased towards an upward direction and, in particular, pivot arm 20 is biased away from base panel 14 of base 11, as shown in FIGS. 9-12, In this way, hinge assembly 80 may be configured to automatically or freely (i.e., without human intervention) pivot or rotate pivot arm 20 between the use position (FIG. 4) and the non-use position (FIGS. 5A-B), as disclosed herein. By pre-loading the spring force of biasing element 82, 92 in an upward direction, when the user desires to move eyeshield 30 to the non-use position, eyeshield 30 may be rotated to the non-use position without the user himself moving or guiding eyeshield 30 in the upward direction toward the use position. Rather, biasing element 82, 92 automatically moves pivot arm 20 which moves eyeshield 30 to the non-use position due to the pre-loaded spring force or tension, orientation, and configuration of biasing element 82, 92.

Figure 9:
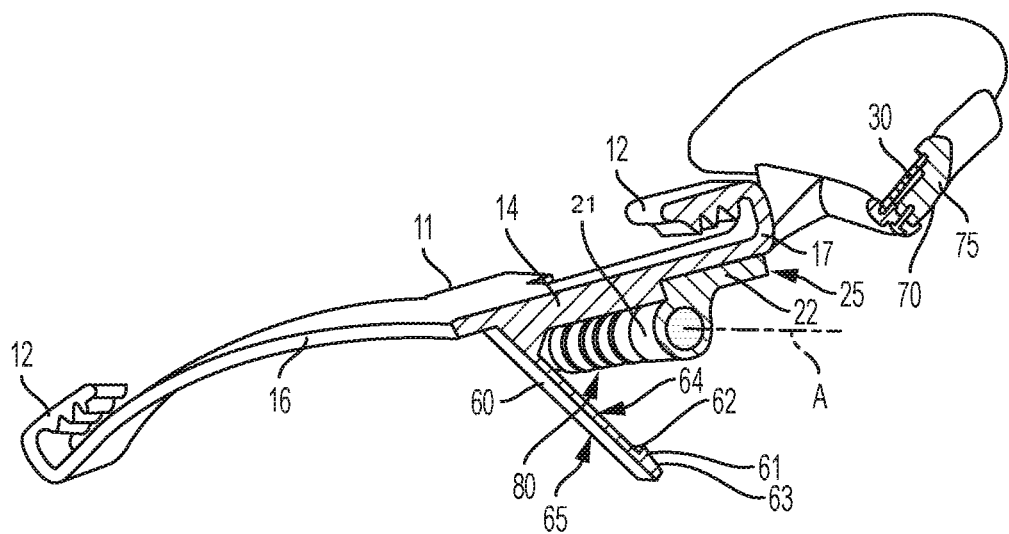
FIG. 9 is a cross-sectional view of the flip-up eyeshield assembly of FIG. 1, illustrating the pivot arm in the non-use position.

With reference to FIG. 9, base 11 of flip-up assembly 10 may further include a latch arm 60 that cooperates with hinge assembly 80 to move eyeshield 30 and pivot arm 20 between the use and non-use positions. Latch arm 60 extends downwardly and forwardly from a central portion of base panel 14 and may be positioned within or adjacent to latch opening 23 of pivot arm 20. As such, at least a portion of latch arm 60 may be exposed by latch opening 23. Latch arm 60 generally includes a first side 64 and an opposite second side 65. In various embodiments, latch arm 60 also generally includes a projection 61 extending outwardly from the first side 64 of latch arm 60 adjacent the distal end thereof. Projection 61 generally defines a shoulder 62 located near the distal end of latch arm 60. Projection 61 may also define a cam surface 63 located between shoulder 62 and the distal end of latch arm 60. In various embodiments, cam surface 63 extends from shoulder 62 to the distal end of latch arm 60.

Referring to FIGS. 11 and 12, when a user desires to move eyeshield 30 between the use position and the non-use position, latch arm 60 may cooperate with hinge assembly 80 to move pivot arm 20 between a latched position (FIG. 11) and a released position (FIG. 12). With reference to FIG. 11, in various embodiments, latch arm 60 may retain pivot arm 20 in a downward or latched position when eyeshield 30 is in the use position. Because latch arm 60 is coupled to the distal end of pivot arm 20, latch arm 60 overcomes the biasing force of hinge assembly 80 to maintain eyeshield 30 in the use position. More particularly, as shown in FIG. 11, when eyeshield 30 is in the use position and is positioned directly in front of the user's eyes, a latch surface 25 at the distal end of pivot panel 22 of pivot arm 20 is positioned against latch arm 60 and is retained on shoulder 62. As such, shoulder 62 of latch arm 60 is exposed by latch opening 23 and allows latch surface 25 of pivot panel 22 to abut, catch, or couple with latch arm 60. The retention of the latch surface 25 of pivot panel 22 on shoulder 62 overcomes the bias of hinge assembly 80 which predisposes pivot panel 22 in an upward direction. As such, this cooperation between shoulder 62 and latch surface 25 of pivot panel 22 allows eyeshield 30 to stay in the use position and maintains pivot panel 22 in a downward position.

Figure 10:
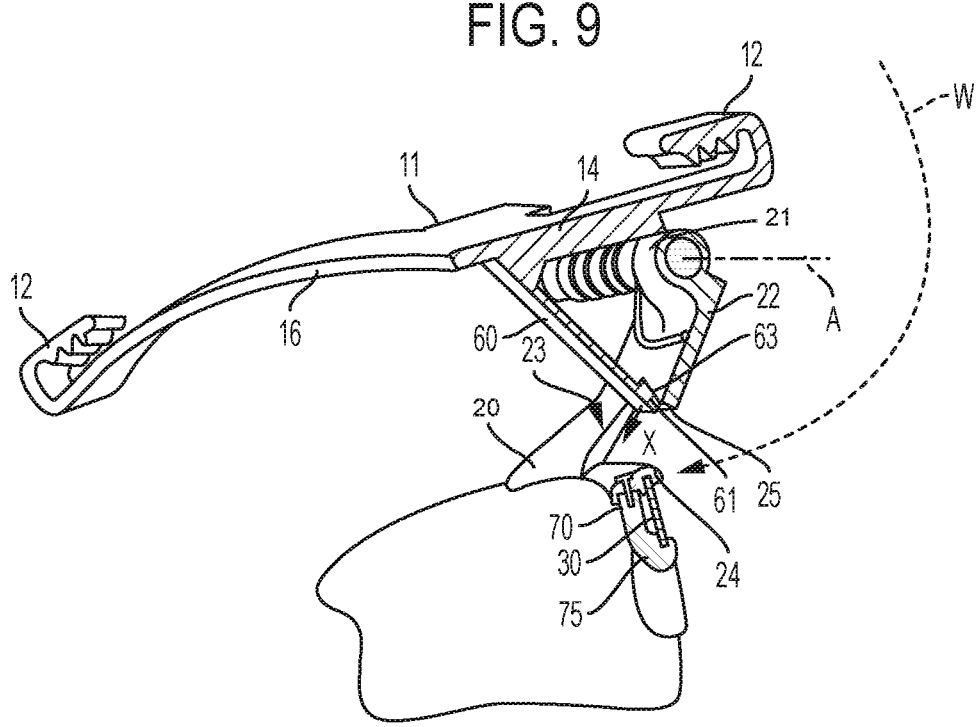
FIG. 10 is a cross-sectional view of the flip-up eyeshield assembly of FIG. 1, illustrating the interaction between a latch arm and the pivot arm when the pivot arm is rotated from the non-use position of FIG. 9 to the use position of FIG. 3.

However, and with reference to FIGS. 9, 10 and 12, when a user desires to move eyeshield 30 to the non-use position such that eyeshield 30 is positioned forward of brim 41 and upward from the user's FOV 124 (FIG. 5A), the user may push on or otherwise move pivot panel 22 and/or latch arm 60 slightly such that the resilient configuration of both latch arm 60 and pivot panel 22 move latch arm 60 and pivot panel 22 away from each other to the released position of pivot arm 20, as shown in FIG. 12. More particularly, the user may actuate the distal end of latch arm 60 in the direction indicated by the arrow T (FIG. 12) until shoulder 62 of projection 61 is disengaged from latching surface 25 of pivot panel 22. In various embodiments, arrow T may point in a variety of other directions, as necessary to accommodate various configurations of latch arm 60, projection 61, shoulder 62, pivot panel 22, latching surface 25 and pivot arm 20, as would be appreciated by those skilled in the art. Because latch surface 25 of pivot panel 22 is moved away from shoulder 62 of latch arm, the biasing force of hinge assembly 80 automatically moves pivot panel 22 in an upward direction. More particularly, latch surface 25 of pivot panel 22 moves along cam surface 63 of latch arm 60 and pivot panel 22 rotates about pivot axis A of shaft S of hinge assembly 80 to move in an outward and upward direction, shown as direction P (FIG. 12). The rotation of pivot panel 22 stops once pivot panel 22 abuts base panel 14 and/or attachment member 17, as shown in FIG. 9. In this non-use position, eyeshield 30 is positioned forwardly and upwardly from pivot panel 22 and is substantially out of the user's FOV 124 (FIG. 5A). As such, to move eyeshield 30 to the non-use position, the user only needs to push or otherwise slightly move latch arm 60 relative to pivot panel 22 and then the biasing force of hinge assembly 80 automatically (i.e., without any further intervention or contact from the user) moves pivot panel 22 and eyeshield 30 to the non-use position.

It may be appreciated that when eyeshield 30 is in the non-use position, the spring tension in biasing element 82, 92 retains eyeshield 30 in the non-use position. More particularly, the spring tension in biasing element 82, 92 is overcome by the user's deliberate movement of eyeshield 30 to the use position but is not overcome by gravity. In this way, when eyeshield 30 is in the non-use position, eyeshield 30 remains in an upward and outward position from brim 41 because the spring tension in biasing element 92 is greater than the force of gravity on eyeshield 30.

However, and referring to FIGS. 9-14, when moving eyeshield 30 to the use position (FIG. 11) from the non-use position (FIG. 9), the user will contact eyeshield 30 and/or pivot panel 22 to push or otherwise move eyeshield 30 and pivot panel 22 in a downward direction about pivot axis A toward latch arm 60 (FIG. 10). In order to overcome the spring force of hinge assembly 80 biasing pivot panel 22 in the upward and non-use position, the user must maintain contact with eyeshield 30 and/or pivot panel 22 until pivot panel 22 is in the latched position with latch arm 60. More particularly, with the distal end of latch arm 60 exposed by latch opening 23, cam surface 63 contacts latching surface 25 of pivot panel 22 when pivot panel 22 is moved downwardly and inwardly in the direction W, causing the distal end of latch arm 60 to deflect away from latching surface 25 in the direction indicated by the arrow X (FIG. 10) due to the resilient configuration of latch arm 60. As latch arm 60 continues into latch opening 23, cam surface 63 slides along latching surface 25 of pivot panel 22, thereby further deflecting the distal end of latch arm 60. When projection 61 has passed latching surface 25, latch arm 60 returns to its original shape (FIG. 11) causing shoulder 62 of projection 61 to engage with latching surface 25 of pivot panel 22. In the latched condition, latch arm 60 secures pivot panel 22 against shoulder 62 of latch arm 60 and eyeshield 30 is retained in the use position. The cooperation between shoulder 62 of latch arm 60 and latch surface 25 of pivot panel 22 overcomes the biasing force of hinge assembly 80 to maintain eyeshield in front of the user's eyes. In various embodiments, the engagement of shoulder 62 of latch arm 60 with latching surface 25 of pivot panel 22 may occur in a variety of other configurations, as would be appreciated by those skilled in the art.

Referring to FIGS. 6 and 8, flip-up eyeshield assembly 10 also may include nosepiece 70 for the comfort of the user and to assist with retaining flip-up eyeshield assembly 10 against the user's nose. Nosepiece 70 may include a bridge 75 and a mounting member 76 extending upwardly from bridge 75. In various embodiments, nosepiece 70 may further include a groove 71 that is formed along at least a portion of bridge 75 (FIG. 8). In various embodiments, groove 71 of bridge 75 may be sized and configured to removably receive at least a portion of lower edge 34 of eyeshield 30. In particular, groove 71 may be shaped to conform to the shape and size of nosepiece opening 36 of eyeshield 30. Referring to FIG. 8, groove 71 may define a slot having a width 100 and a depth 112. Furthermore, groove 71 may include internal faces that are of different or equal dimensions. For example, a rearward face 72 may be of a greater cross-sectional length than a forward face 73, and may further differ from that of a lower face 74 of groove 71. In various embodiments, rearward, forward, and lower faces 72, 73, 74 of groove 71 may be modified to provide varying degrees of retention of lower edge 34 and/or nosepiece opening 36 of eyeshield 30 within groove 71. Additionally, in various embodiments, nosepiece 70 may be made from a resilient and lightweight material, such as plastic, and/or molded as a single piece.

Still referring to FIGS. 6 and 8, mounting member 76 of nosepiece 70 may be coupled to a central portion of brow member 24 of pivot arm 20. In one embodiment, mounting member 76 of nosepiece 70 may be received by a recess 54 in a central portion of brow member 24. Recess 54 and mounting member 76 may be formed and configured with matching cross-sectional shapes so as to permit a single orientation between the two components when assembled together. Furthermore, in various embodiments, mounting member 76 of nosepiece 70 may be secured to brow member 24 of pivot arm 20 with a fastening mechanism 69 such as a screw, bolt, adhesive, rivet, pin, insert nut or the like, Fastening mechanism 69 adds structural strength and rigidity to the assembly.

Referring now to FIGS. 6 and 7, in general, eyeshield 30, pivot arm 20 and nosepiece 70 are cooperatively engaged when assembled. In one embodiment, nosepiece 70 may be connected to pivot arm 20 posterior to eyeshield 30. In other various embodiments, nosepiece 70 may be connected to pivot arm 20 anterior to eyeshield 30 (not shown). Once assembled, eyeshield 30 is cooperatively engaged by groove 50 of pivot arm 20 and groove 71 of nosepiece 70 (FIG. 8). Pivot arm 20 and nosepiece 70 may be in a fixed positional relationship relative to each other which ensures that eyeshield 30 is fixed on pivot arm 20 to move eyeshield 30 between the use and non-use positions.

Referring now to FIGS. 15A, 15B and 16, the attachment of mounting member 76 to pivot arm 20 may be accomplished in a variety of configurations. In an exemplary embodiment, a male and female-type interlocking connection may be used. For example, pivot arm 20 or mounting member 76 may be formed as a male-type connector that may be removably connected to a corresponding female-type connector of the other one of pivot arm 20 and mounting member 76.

With reference to FIGS. 15A and 15B, in various embodiments, pivot arm 20 may include a post 27 extending downwardly from a central portion of brow member 24 for coupling pivot arm 20 to mounting member 76 of nosepiece 70 and, therefore, to eyeshield 30. Post 27 may be formed in a variety of geometric shapes, as described herein. In one embodiment, post 27 may be substantially rectangular in shape and of sufficient width and thickness to provide engagement with nosepiece 70, as discussed further below. In various embodiments, post 27 may be integrally formed with pivot arm 20, such as being formed of a single, continuous piece of material. Additionally, in various embodiments, pivot arm 20 and post 27 may be formed by way of injection molding. In another embodiment, post 27 may be formed of a separate material and may be joined to pivot arm 20 using an adhesive, mechanical interlock, interference fit or other fastener. Finally, in various embodiments, post 27 may also include an interlocking portion 28 which may be formed at the distal end of post 27. In an exemplary embodiment, interlocking portion 28 is integral with post 27 and extends outwardly from the distal end of post 27. In addition, a posterior side 78 of mounting member 76 may be formed to include a recess 77 into which post 27 of pivot arm 20 may be received. In such an embodiment, interlocking portion 28 of post 27 may be formed to mate with recess 77 of mounting member 76. Alternatively, an anterior side 79 of nosepiece 70 may be configured to include recess 77.

Still referring to FIGS. 15A, 15B and 16, in this embodiment, post 27 may be connected to brow member 24 posterior to groove 50. In addition, eyeshield 30 may be mounted anterior to post 27 and mounting member 76 of nosepiece 70. Furthermore, with eyeshield 30 assembled, mounting member 76 may be disposed intermediate eyeshield 30 and post 27 of pivot arm 20. In other various embodiments, post 27 may be connected to brow member 24 anterior to groove 50. Furthermore, in various embodiments, eyeshield 30 may be mounted posterior to post 27 and mounting member 76 of nosepiece 70. Such embodiments and modifications are considered to be within the scope of the present disclosure and teachings.

Furthermore, in various embodiments, pivot arm 20 may include a recess into which a post of mounting member 76 may be receivable therein. In other various embodiments, other first and second complementary surface structures may be used. Such embodiments and modifications are considered to be within the scope of the present disclosure.

Figure 17:
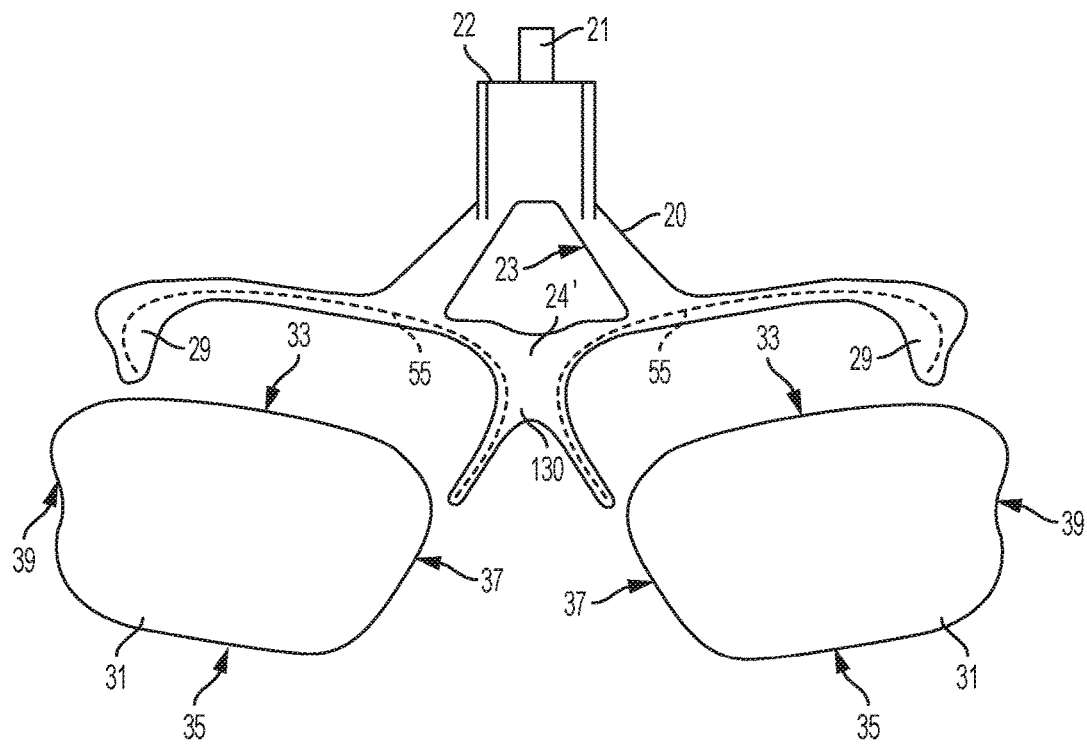
FIG. 17 is an exploded front view of the pivot arm and dual lenses in the eyeshield of the present disclosure.
Figure 18:
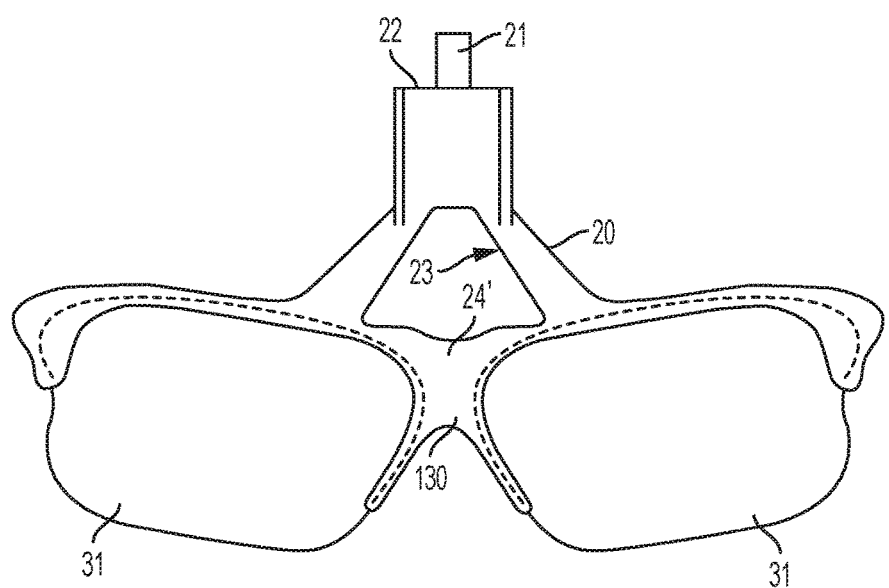
FIG. 18 is a front view of the pivot arm assembled with the dual lenses in the eyeshield of FIG. 17.

Referring to FIGS. 17 and 18, in one embodiment, flip-up eyeshield assembly 10 may pivotally attach dual lenses 31 in eyeshield 30 to brim 41 of head covering 40. In various embodiments, each of dual lenses 31 may include an upper edge 33, a lower edge 35, an inside edge 37 and an outside edge 39. Furthermore, pivot arm 20 generally includes opposing terminals 29 at both ends of a brow member 24'. Pivot arm 20 may further generally include a nosepiece member 130 extending downwardly from a central portion of brow member 24'. In various embodiments, nosepiece member 130 is integrally formed with pivot arm 20, such as being formed of a single, continuous piece of material as in injection molding. Additionally, in other various embodiments, nosepiece member 130 may be formed of a separate material and may be joined to pivot arm 20 using an adhesive, mechanical interlock, interference fit or other fastener. Pivot arm 20 may also generally include a groove 55. Groove 55 defines a slot having a width and a depth. Groove 55 generally extends at least partially along brow member 24' and at least partially along nosepiece member 130. In various embodiments, groove 55 may be sized and configured to receive upper edges 33 of lenses 31. Additionally, groove 55 is generally sized and configured to receive inside edge 37 of lenses 31. Furthermore, opposing terminals 29 are generally sized and configured to receive at least a portion of outside edge 39 of lenses 31. In one embodiment, terminals 29 are coupled to only an upper portion of lenses 31, however, in further embodiments, terminals 29 may extend continuously around all portions of lenses 31 to define a generally circular or rectangular shape complementary to the shape of lenses 31. The width and depth of groove 55 and opposing terminals 29 may be modified to provide varying degrees of retention of lenses 31 therein. FIG. 18 illustrates the cooperative engagement of lenses 31 and pivot arm 20 when assembled together. In various embodiments, due to the fixed relationship between brow member 24', nosepiece member 130 and opposing terminals 29, lenses 31 may be firmly retained by pivot arm 20 when lenses 31 and pivot arm 20 are assembled together.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

Furthermore, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An eyeshield assembly configured to couple to a brim of a head covering, comprising:
    a pivot arm having a latch surface and being configured to move between a latched position, when the eyeshield assembly is in a use position, and a released position, when the eyeshield assembly is in a non-use position;
    a latch arm configured to selectively engage and disengage the latch surface of the pivot arm when the pivot arm is in the latched position; and
    a hinge assembly operably coupled to the pivot arm and including a biasing element;
    whereupon the latch arm disengages the latch surface of the pivot arm in the latched position, the biasing element is configured to move the pivot arm away from the latch arm to move the pivot arm from the latched position to the released position.

2. The eyeshield assembly of claim 1, wherein the biasing element biases the pivot arm toward the released position.

3. The eyeshield assembly of claim 2, wherein the biasing element includes only one torsion spring, and the eyeshield assembly includes no other torsion springs.

4. The eyeshield assembly of claim 2, wherein the biasing element includes a double torsion spring.

5. The eyeshield assembly of claim 1, further comprising an eyeshield coupled to the pivot arm, and the pivot arm is configured to move the eyeshield between the use position, in which the eyeshield intersects a forward-facing line of sight of a user, and the non-use position, in which the eyeshield is positioned upwardly of the forward-facing line of sight.

6. The eyeshield assembly of claim 5, wherein the eyeshield is positioned forward and upward of a front edge of the brim of the head covering when the eyeshield is in the non-use position.

7. The eyeshield assembly of claim 1, wherein the distal end of the latch arm includes a shoulder configured to engage the latch surface of the pivot arm when the pivot arm is in the latched position.

8. The eyeshield assembly of claim 1, wherein the hinge assembly further includes a shaft having a pivot axis, the pivot arm pivoting about the pivot axis to move from the latched position to the released position.

9. The eyeshield assembly of claim 1, wherein the latch arm is biased to engage the pivot arm when the pivot arm is in the latched position.

10. The eyeshield assembly of claim 1, wherein the pivot arm further comprises a latch opening, and the latch arm is configured to extend through the latch opening in the latched position.

11. The eyeshield assembly of claim 1, further comprising a base coupled to the latch arm, the base being configured to couple to a lower surface of the brim of the head covering.

12. The eyeshield assembly of claim 11, wherein the base comprises a coupling portion configured to detachably engage the brim of the head covering.

13. The eyeshield assembly of claim 12, wherein the coupling portion comprises a hooked end portion.

* * * * *